No. 719,418. PATENTED FEB. 3, 1903.
A. BAINVILLE.
ELECTRIC ACCUMULATOR PLATE.
APPLICATION FILED JULY 14, 1902.
NO MODEL.
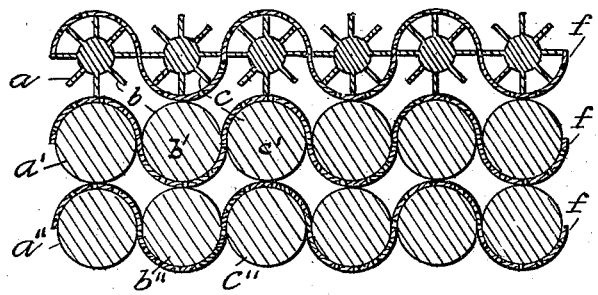
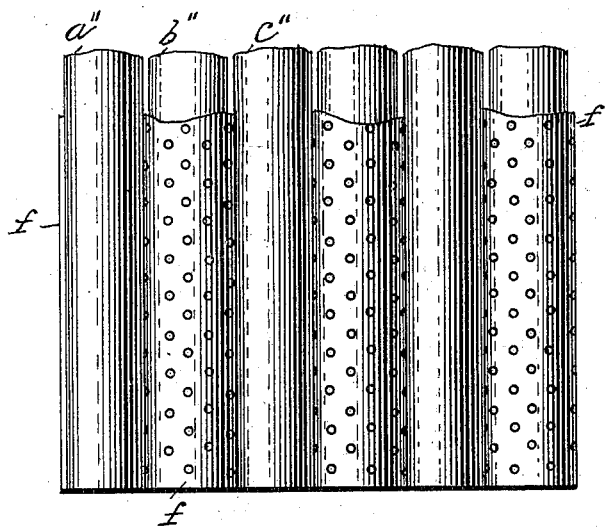
Witnesses
Norris A. Clark.
Alex Scott
Inventor
Auguste Bainville
By Alexander &Co.
Attorneys

UNITED STATES PATENT OFFICE.

AUGUSTE BAINVILLE, OF NANTERRE, FRANCE.

ELECTRIC-ACCUMULATOR PLATE.

SPECIFICATION forming part of Letters Patent No. 719,418, dated February 3, 1903.

Application filed July 14, 1902. Serial No. 115,462. (No model.)

*To all whom it may concern:*

Be it known that I, AUGUSTE BAINVILLE, engineer, a citizen of the French Republic, residing at Nanterre, France, have invented a new and useful Improvement in Electric-Accumulator Plates; and I do hereby declare the following to be a full, clear, and exact description of the same.

The object of the present specification is to describe useful improvements in the methods of construction of electric batteries in order to derive all the advantages from the electrodes with winged rods or elements for electric accumulators described in my previous patent, No. 696,157, of December 3, 1901.

In the drawings, Figure 1 shows a horizontal section of three plates, of which the elementary rods are lettered $a\ b\ c$, $a'\ b'\ c'$, $a''\ b''\ c''$, respectively. Fig. 2 is an elevation of the same.

I will now proceed to explain the principle and applications of the said invention.

The principle, as shown by the figures, consists in insulating-plates of opposite polarity, particularly with regard to movable elements, by placing between the elementary rods, the assemblage of which constitutes an electrode, a sheet of insulating material, which is porous or perforated, so as to give the electrolyte access to the rods. This sheet is corrugated, so as to pass around adjacent rods of the same plate, alternately covering half of the circumference of each rod in such a manner as to alternately cover the "face" of one rod and the "back" of the next. This arrangement or construction is illustrated in the drawings, where the insulating perforated sheet is represented in horizontal section in Fig. 1 and in elevation in Fig. 2. By this means I obtain the following results:

First. I modify in a favorable manner the distribution of the current between the various plates of an element, provided the rods of two adjacent plates, which are placed opposite each other—such as $a\ a'\ a''\ b\ b'\ b''$, Fig. 1—are separated by the insulating-partition $f$, while those which are not arranged in line—such as $a\ b'$ and $a'\ b''$, Fig. 1—are not separated from each other by any insulating material. It results, therefore, from this arrangement that the imperfection in the distribution of the current between the plates, which may occur through the cylindrical shape of the elements or rods, is for the greater part done away with.

Second. I make the insulator, with its plate, rigid, which is particularly useful as regards the arrangement and various manipulation of the plates during the working of the elements formed by these plates thus insulated one from the other.

Third. I can thus pack the various plates of an element close together without intervals, and consequently reduce the size of the accumulator and the interior resistance of the element. This placing together of the plates of opposite polarity is, moreover, peculiar to my type of electrode, the winged rods of which are provided with sufficient empty spaces to contain the necessary electrolyte. The vertical passages formed by the walls of two adjacent wings likewise guide the active matter, which in the course of working is detached from the elements toward the bottom of the vessel. Nevertheless my device in a general way can be advantageously used for all accumulators formed of parallel rods of any form or section.

I claim—

1. An electric accumulator consisting of a number of rods separated from each other by a removable corrugated sheet of perforated insulating material arranged in such manner as to cover the face of one rod and the back of the next.

2. An electric-accumulator plate consisting of a number of rods of lead or the like, and a removable sheet of corrugated porous insulating material arranged to cover alternately the face of one rod and the back of the next, thereby improving the distribution of the current and rendering it as uniform as possible.

3. In an electric accumulator, the combination of two or more plates each composed of a series of rods, and corrugated sheets of perforated insulating material separating the rods in each plate from each other and those in one plate from those of the next plate, contiguous thereto.

In testimony whereof I have signed this specification in the presence of two subscribing witnesses.

AUGUSTE BAINVILLE.

Witnesses:
   HIPPOLYTE ROYER,
   PIERRE ROYER.